United States Patent [19]
Cassell et al.

[11] 4,264,225
[45] Apr. 28, 1981

[54] BOUNCE DAMPENING SYSTEM FOR SWITCH ACTUATORS

[75] Inventors: John N. Cassell, Lexington; John A. Elder, Jr., Versailles; Benjamin G. Pastrick, Lexington, all of Ky.; William J. Thornhill, Austin, Tex.

[73] Assignee: International Business Machines Corporation, Armonk, N.Y.

[21] Appl. No.: 753,326

[22] Filed: Dec. 22, 1976

[51] Int. Cl.³ ............................................. B41J 5/08
[52] U.S. Cl. .................................. 400/478; 400/479.2
[58] Field of Search ................................... 197/16, 98

[56] References Cited

U.S. PATENT DOCUMENTS

| | | | |
|---|---|---|---|
| 3,189,153 | 6/1965 | Barnard et al. | 197/98 |
| 3,422,946 | 1/1969 | Rekewitz | 197/16 |
| 3,817,366 | 6/1974 | Blum | 197/16 |

Primary Examiner—Ernest T. Wright, Jr.
Attorney, Agent, or Firm—John W. Girvin, Jr.

[57] ABSTRACT

A bounce dampening system reduces switch actuator bounce when the actuators are restored to their home position. Included are selection interposers, one of which is selectively driven to thereby effect motion of selection bails and corresponding switch actuators. A reverse interposer is simultaneously driven. A spring restores the reverse interposer after the actuation cycle thereby carrying the bails and switch actuators to their home position. The return spring and the mass of the reverse interposer prevents actuator bounce and insures a timely return of the actuators.

4 Claims, 4 Drawing Figures

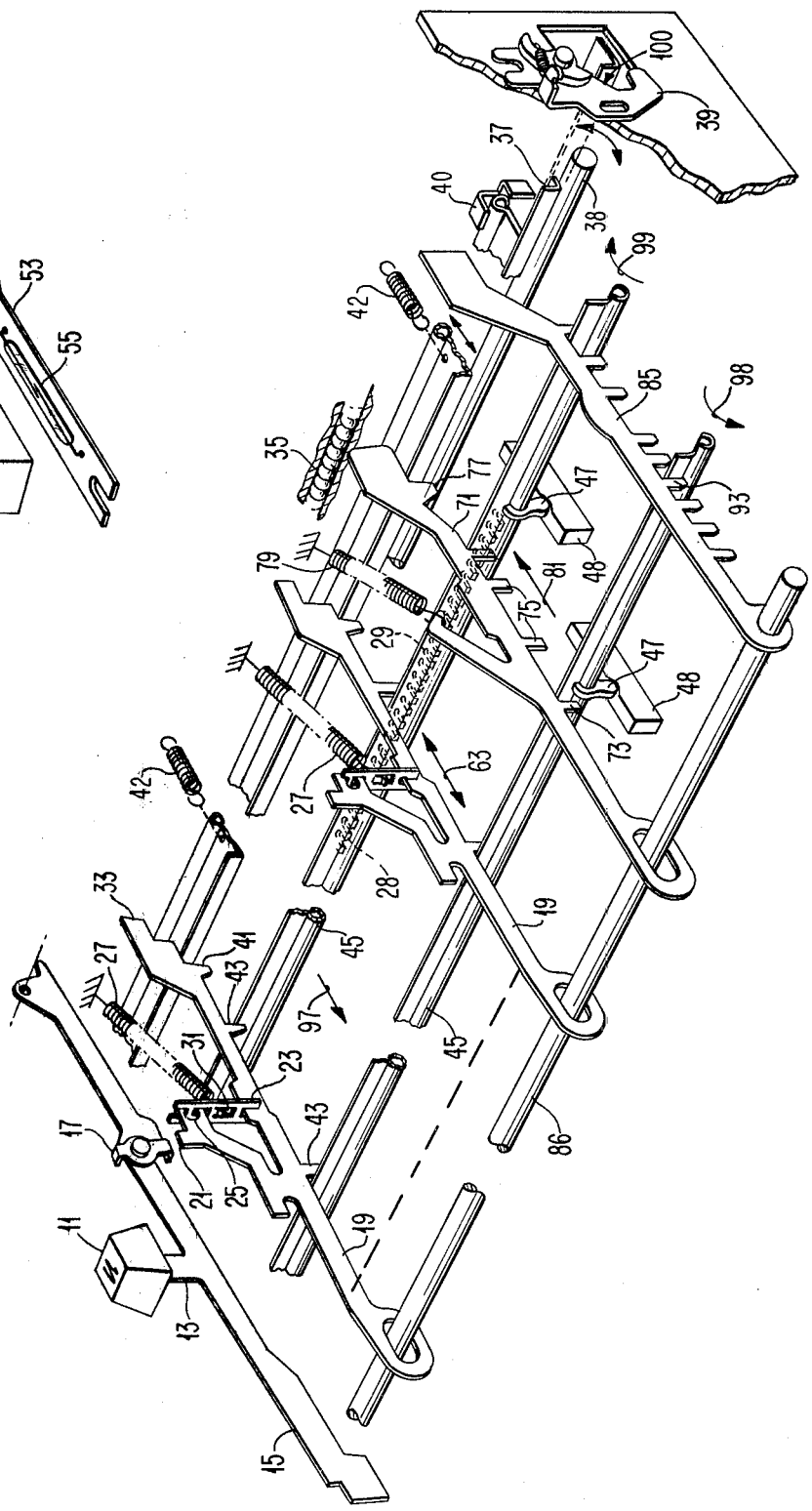

BOUNCE DAMPENING SYSTEM FOR SWITCH ACTUATORS

BACKGROUND OF THE INVENTION

1. Field

This invention relates to key actuated electrical switches and, more particularly, to a bounce dampening system for use with such switches.

2. Description of the Prior Art

Prior art keyboard mechanisms include plural switches and associated switch actuators which are driven by code bails or the like. Such keyboard devices are subject to providing erroneous signals should the switch actuator momentarily close upon being restored to its home position because of mechanical oscillations or bounce encountered thereby. Prior keyboard devices have included a separate strobe switch which is independently actuated to effect sampling of the signal switches only during a predetermined time period. Such devices must be accurately and precisely adjusted and synchronized. Further, prior art switches have been built with dampening devices built into each switch. Such switches require significant drive power, are expensive and hard to adjust since each actuator independently returns to its home position.

SUMMARY OF THE INVENTION

In order to overcome the above noted shortcomings of the prior art and provide a switch actuation system which does not generate erroneous signals nor require a separate strobe switch, a bounce dampening system is employed which simultaneously reduces actuator bounce of all actuators which have been moved. The bounce dampening system includes a reverse interposer which simultaneously drives all selected actuators to their home position. The reverse interposer drive system provides sufficient mass and spring force to prevent actuator bounce thereby preventing false signal generation. Further, all actuators are simultaneously returned to their home position by the reverse interposer. The time required to return the actuators to their home position is approximately the same for each cycle regardless of the number of actuators and bails selected.

Accordingly, it is the principle object of the invention to provide an efficient, low cost, switch actuation system for a keyboard mechanism or the like.

It is a further object of the invention to provide a bounce dampening system which is operable upon all actuated switch actuators.

It is a still further object of the invention to insure the prompt and timely return of all switch actuators to their home position while eliminating momentary contact closure occasioned by mechanical oscillations of the switch actuator in returning to its home position.

The foregoing objects, features and advantages of the invention will be apparent from the following more particular description of the preferred embodiment of the invention as illustrated in the accompanying drawing.

IN THE DRAWING

FIG. 1 is a three dimensional illustration of a partial keyboard which incorporates the bounce dampening system of the present invention.

FIG. 2 is an illustration of a switch assembly.

DETAILED DESCRIPTION

Figure 3:
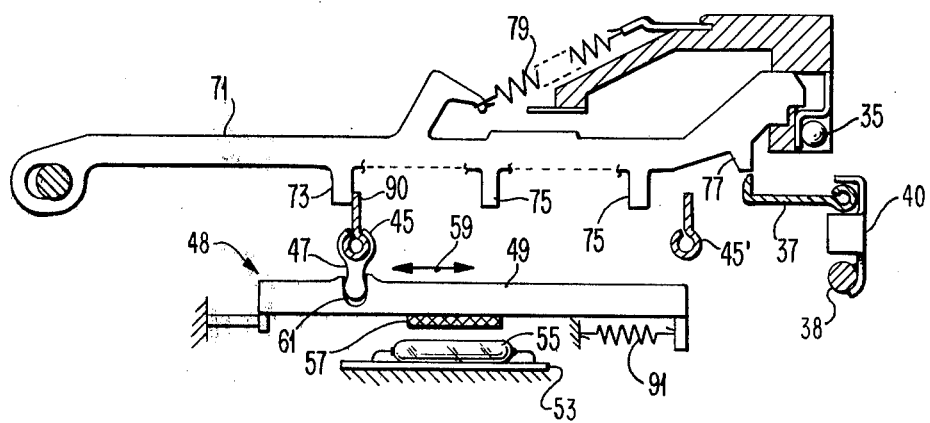
FIG. 3 is a side elevation view of a reverse interposer.

Referring now to FIG. 1 of the drawing, a three dimensional illustration of a partial keyboard which incorporates the bounce dampening system of the present invention is shown. The keyboard includes a plurality of keybuttons 11 which are each connected by a key stem 13 to a corresponding key lever 15. Each key lever 15 includes a pawl 17 which acts upon a selection interposer 19.

As a selection interposer 19 is driven downward by the action of a pawl 17 on its upper surface 21, it carries therewith a latching member 23. Each latching member 23 is pivotally supported on the interposer journal 25 and is spring biased by a spring 27 against a tang 28 of the latch plate 29. As the latching member 23 moves downward, hole 31 thereof aligns with a tang 28 of the latch plate 29 allowing the latching member 23 to pivot in a counterclockwise direction as viewed about the journal 25. The tang 28 of the latch plate 29 then extends through the hole 31 in the latching member 23 thereby preventing the interposer 19 from moving in an upward direction.

The downward motion of the interposer 19 causes the rear portion 33 thereof to enter a ball tube interlock 35. The ball tube interlock 35 functions in a conventional fashion to prevent downward motion of other interposers 19 until the first interposer 19 is removed from the ball tube interlock 35. Further, the downward motion of an interposer 19 and the corresponding pivotal motion of its latching member 23 initiates a machine cycle through an actuator such as a cycle bail which is responsive to such motion.

Upon initiation of the machine cycle, filter bail 37 pivotally moves with rotating rod 38 forward over frame 39 under the urging of member 40, engaging the drive tang 41 of the selection interposer 19 which has been depressed and latched into place. The member 40 is fixedly secured to the rod 38 and pivots therewith. The remaining selection interposers 19 remain above the moving filter bail 37 and are not engaged thereby. The motion of the selection interposer 19 causes the hole 31 of the latching member 23 to separate from the tang 28 of the latch plate 29. Since the motion of the filter bail 37 is both leftward and downward, it becomes disengaged from the drive tang 41 of the selection interposer 19 allowing the selection interposer 19 to be restored by its associated spring 27 to its initial position. The filter bail 37 is returned to its home position when rod 38 rotates in an opposite direction under the urging of springs 42.

Each selection interposer 19 contains a plurality of coded selection tangs 43 which engage corresponding selection bails 45. Each selection bail 45 has attached thereto a switch lever 47 which engages a corresponding switch assembly 48. With reference to FIG. 2 of the drawing, a switch assembly 48 is depicted which includes a switch actuator 49, a housing 51 and a switch plate 53 upon which is mounted a reed switch 55. The switch actuator 49 has a magnet assembly 57 secured thereto. Motion of the switch actuator 49 in the direction of arrows 59 relative to the housing 51 and reed switch 55 effects closure and opening of the contacts of the reed switch 55. The switch actuator 49 includes a socket 61 which is engaged by a switch lever 47 of FIG. 1. Thus motion of a selection bail 45 and corresponding switch lever 47 in the direction of arrows 63 of FIG. 1 effects corresponding motion of its associated switch actuator 49 of FIG. 2 in the direction of arrows 59. Motion of the switch actuator 49 in the direction of arrows 59 effects the closure and opening of the reed switch 55. An electrical signal generated by such switch closure and opening is in turn supplied to a utilization system such as a typewriter or the like.

The distance traveled by the switch actuator 49 when moving from an open switch position to a closed switch position is approximately 1/32 inch. In view of the short distance of travel, should the switch actuator 49 bounce or oscillate upon its return to its home position, a false electrical signal can be generated by the closure of the reed switch 55 upon such actuator bounce. In order to insure that such contact bounce does not occur, a reverse interposer system is employed to drive the switch actuators 49 to their home position and retain them there.

With reference to FIG. 1 of the drawing, the reverse interposer 71 is driven by the filter bail 37 during each cycle of operation. That is, the reverse interposer 71 is always driven by the filter bail 37 along with the selection interposer 19 which has been latched down. The tangs 73, 75 of the reverse interposer 71 are located on the opposite sides of the selection bails 45 from the coded selection tangs 43 of the selection interposers 19. Thus, the tangs 73, 75 do not drivingly engage the selection bails 45 during that portion of the keyboard cycle when the reverse interposer 71 is driven by the filter bail 37. However, once the filter bail 37 lowers sufficiently to clear the drive tang 41 of the selected selection interposer 19 and the drive tang 77 of the reverse interposer 71, the system is restored to its initial condition by the force of spring 79 acting upon the reverse interposer 71. That is, spring 79 exerts a force on the reverse interposer 71 whose tangs 73, 75 act upon each selection bail 45 which was previously moved by a selection interposer 19. The selection bails 45 are thus restored in the direction of arrow 81 toward their initial position.

The selection bails 45 when free of the selection interposer 19 which was previously depressed and thereafter restored toward its home position, carry therewith their corresponding switch lever 47 which in turn restores its corresponding switch actuator 49 of FIG. 2 to its home position. The mass of the reverse interposer 71 and the elements carried thereby along with the spring force prevent the switch actuators 49 of FIG. 2 from bouncing upon restoration. Further, all selected switch actuators 49 are simultaneously restored by the reverse interposer 71 to their home position. The time required to restore the switch actuators 49 to their home position is approximately the same regardless of the number of selection bails 45 which were moved by the selection interposer 19. That is, in a typical system, there are six selection bails 45 and corresponding switch actuators 49. Further, there are 53 selection interposers 19 corresponding to the functions which are desirous to have on a typewriter device. Thus, anywhere from one to six selection bails 45 are moved by a selected selection interposer 19 in accordance with the code requirements of the particular characters or functions selected.

A stop interposer 85 is also employed with the keyboard system to insure that the selection bails 45 are driven to a proper home position. The stop interposer 85 is fixedly secured to the fulcrum rod 86 and does not move during a machine cycle.

Referring now to FIG. 3 of the drawing, a side elevation view of a reverse interposer 71 of the present invention is depicted. As depicted, the reverse interposer 71 has been driven to its leftmost position by the filter bail 37. The selection bail 45 has also been driven to its leftmost position by a selection interposer 19 of FIG. 1 while the selection bail 45' has not been moved by the selection interposer 19 of FIG. 1. Once the filter bail 37 has cleared the drive tang 77 of the reverse interposer 71, the spring 79 urges the reverse interposer 71 toward the right. The tangs 73, 75 of the reverse interposer 71 carry therewith the vanes 90 of the selection bails 45 which have been previously moved to the left. The selection bail 45 pivots and carries therewith the switch lever 47 which in turn effects motion of the switch actuator 49 toward the left. This causes the magnet 57 to effect opening of the reed switch 55. A light spring 91 also urges the switch actuator 49 toward its leftward home position. The employment of a heavy spring sufficient to effect switch actuator 49 return would overload the drive system and require complex adjustment as has been described.

Figure 4:
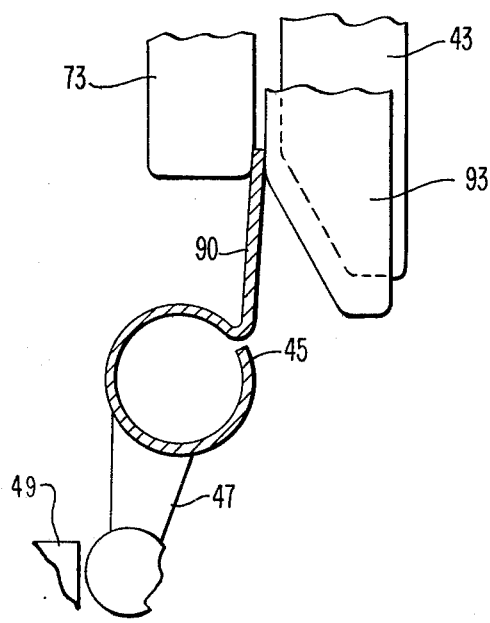
FIG. 4 is a side elevation view of an actuator bail in its home position.

Referring now to FIG. 4 of the drawing, a side elevation view of a selection bail 45 in its home position is depicted. As thusly positioned, the selection bail 45 includes the vane 90 which extends upwardly and rests against a tang 93 of the stop interposer 85 of FIG. 1. A tang 73 of the reverse interposer 71 of FIG. 1 has driven the vane 90 to this position. A selection tang 43 of one of the selection interposers 19 of FIG. 1 rests just forward of the vane 90 as do other tangs 43 of other selection interposers 19 of FIG. 1. Upon initiation of a keyboard cycle, both a tang 43 and the tang 73 are driven leftward as viewed, the tang 43 carrying therewith the vane 90 thereby effecting motion of the selection bail 45. The return motion of the vane 90 is then thereafter controlled by the tang 73 acting upon the vane 90. As the vane 90 is restored to its initial position, it effects motion of the lever 47 attached to the selection bail 45 of FIG. 1.

Referring once again to FIG. 1 of the drawing, an operational cycle of the keyboard including the bounce dampening system of the present invention will be described. A keyboard cycle is initiated upon depression of a keybutton 11 which effects downward motion of its corresponding selection interposer 19. The downward motion of such a selection interposer 19 effects the latching thereof in a down position and the initiation of a keyboard cycle. The ball tube interlock 35 prevents another interposer 19 from thereafter moving downward until the first depressed interposer 19 clears the ball tube interlock 35. Upon initiation of a keyboard cycle, the filter bail 37 engages the drive tang 41 of the downwardly moved interposer 19 and the drive tang 77 of the reverse interposer 71 driving them both in the direction of arrow 97. The coded selection tangs 43 of the now moving selection interposer 19 engage corresponding selection bails 45 causing them to move in the direction of arrow 98. The motion of the selection bail 45 is transmitted through switch lever 47 to the switch actuator 49 of FIG. 2. Motion of the switch actuator 49 effects the closing of the contacts of the reed switch 55 thereby generating an electrical signal. Once the filter bail 37 no longer engages the drive tangs 41 and 77 as it is cammed away therefrom during its motion by the coming surface 100 on the frame 39, the tangs 73, 75 of the reverse interposer 71 drive the bails 45 in the direction of arrow 99 thereby restoring them against the tangs 93 of the stop interposer 85. As the bails 45 are thusly restored to their home position, they effect the restoring motion of the switch actuator 49 of FIGS. 2 and 3 through the switch levers 47. The spring 79 effects the return motion of the reverse interposer 71.

The mass and spring force of the reverse interposer system prevents switch actuator bounce and insures the simultaneous return of all selected switch actuators 49. It is to be noted that while the number of coded selection tangs 43 of each selection interposer 19 vary in accordance with the function code, the number of tangs 73, 75 of the reverse interposer 71 correspond to the number of selection bails 45. This insures that all selection bails 45 which are moved by a selection interposer 19 are restored by the reverse interposer 71.

With reference to FIG. 2 of the drawing, the switch actuator 49 and switching device described is a magnetically actuated reed switch 55. As is recognized by those skilled in the art, any type of electrical switching device such as a contact switch which exhibits contact bounce would be suitable for use with the present invention. Further, while the invention has been particularly described with respect to a typewriter keyboard device, any type of key actuated or coded switching system may be employed.

While the invention has been particularly shown and described with reference to a preferred embodiment thereof, it will be understood by those skilled in the art that various changes in form and detail may be made therein without departing from the spirit and scope of the invention.

What is claimed is:

1. A keyboard mechanism including a dampening system for eliminating oscillation of a plurality of selectively operable switch actuators comprising:
   a stop means for defining a first position for said switch actuators;
   drive means;
   a plurality of selection interposers at least a selected one of which being responsive to said drive means for moving in a first direction and operable upon at least one of the switch actuators for moving said at least one of the switch actuators from said first position to a second position;
   a reverse interposer means driven in said first direction by said drive means simultaneously with at least said selected one of said selection interposers and thereafter driven in a second direction opposite said first direction, said reverse interposer means being mechanically uncoupled from the switch actuators during motion in the first direction and coupled only to those switch actuators which were moved to said second position during motion in said second direction, said reverse interposer means driving said switch actuators against said stop means and dampening oscillation of said switch actuators at said first position.

2. The keyboard mechanism of claim 1 further comprising:
   a plurality of selection bails each engageable by selected ones of said selection interposers when said ones of said selection interposers are driven in said first direction and engageable by said reverse interposer means when said reverse interposer means is driven in said second direction, said selection bails being coupled to said switch actuators and moving with said selection interposers to effect motion of said switch actuators.

3. The keyboard mechanism set forth in claim 2 wherein said stop means comprises a stop interposer fixedly secured with respect to said drive means, said reverse interposer means driving said selection bails against extended surfaces of said stop interposer to define said first position.

4. The keyboard mechanism set forth in claim 1 further including a spring attached to said reverse interposer means for driving said reverse interposer means in said second direction and for preventing oscillation of said switch actuators.

* * * * *